United States Patent
Lan et al.

(10) Patent No.: US 9,594,684 B2
(45) Date of Patent: Mar. 14, 2017

(54) METHOD FOR TEMPORARILY STORING DATA AND STORAGE DEVICE

(71) Applicant: Huawei Technologies Co., Ltd., Shenzhen (CN)

(72) Inventors: Kejia Lan, Chengdu (CN); Yongbo Cheng, Chengdu (CN); Chenghong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/732,172

(22) Filed: Jun. 5, 2015

(65) Prior Publication Data

US 2015/0363315 A1 Dec. 17, 2015

(30) Foreign Application Priority Data

Jun. 11, 2014 (CN) .......................... 2014 1 0258859

(51) Int. Cl.
*G06F 12/08* (2016.01)

(52) U.S. Cl.
CPC .. *G06F 12/0831* (2013.01); *G06F 2212/1016* (2013.01)

(58) Field of Classification Search
CPC ............. G06F 12/0815; G06F 12/0831; G06F 2212/62; G06F 2212/621
USPC .................. 711/121, 124, 141, 146
See application file for complete search history.

(56) References Cited

U.S. PATENT DOCUMENTS

| 6,691,220 B1 * | 2/2004 | Guthrie ................. G06F 9/3836 712/219 |
| 7,836,144 B2 | 11/2010 | Mannava et al. |
| 2006/0053257 A1 * | 3/2006 | Sistla .................... G06F 12/084 711/143 |
| 2006/0085602 A1 | 4/2006 | Huggahalli et al. |
| 2007/0050559 A1 * | 3/2007 | Alsup ................... G06F 9/3004 711/145 |
| 2008/0244195 A1 | 10/2008 | Sistla et al. |
| 2011/0078384 A1 | 3/2011 | Kumar et al. |

(Continued)

FOREIGN PATENT DOCUMENTS

| CN | 101036118 A | 9/2007 |
| CN | 102033715 A | 4/2011 |

(Continued)

*Primary Examiner* — Gary Portka
(74) *Attorney, Agent, or Firm* — Leydig, Voit & Mayer, Ltd.

(57) ABSTRACT

A method for temporarily storing data and a storage device is provided. The method for temporarily storing data is applied to the storage device, and the storage device includes a source agent and a target agent. The method includes: sending, by the source agent, a data obtaining request to the target agent; receiving, by the source agent, target data that is corresponding to the data obtaining request and is returned by the target agent; determining, by the source agent, whether a snooping request that is for the target data and sent by the target agent is received after the data obtaining request is sent and before the target data is received, where the snooping request indicates that the target agent is simultaneously processing an obtaining request from another source agent for the target data; and if the snooping request is received, discarding, by the source agent, the target data.

18 Claims, 13 Drawing Sheets

(56) References Cited

U.S. PATENT DOCUMENTS

2013/0111150 A1   5/2013   Zhao et al.

FOREIGN PATENT DOCUMENTS

| CN | 102439571 | A | 5/2012 |
| CN | 104035888 | A | 9/2014 |
| WO | 2014022397 | A1 | 2/2014 |

* cited by examiner

METHOD FOR TEMPORARILY STORING DATA AND STORAGE DEVICE

CROSS-REFERENCE TO RELATED APPLICATIONS

This application claims priority to Chinese Patent Application No. 201410258859.2, filed on Jun. 11, 2014, which is hereby incorporated by reference in its entirety.

TECHNICAL FIELD

Embodiments of the present invention relate to the field of electronic technologies, and in particular, to a method for temporarily storing data and a storage device.

BACKGROUND

In a multiprocessor system, each processor has a one-level cache or a two-level cache, and multiple copies of one piece of data may simultaneously exist in different caches. If a processor freely modifies their local copies, different processors will observe different results about the data in the different caches. In addition, modification performed by an IO (Input Output, input output) on a main memory may also cause an inconsistency problem. To solve a problem of cache consistency, the MESI (Modified, Exclusive, Shared, Invalid, Modified, Exclusive, Shared, Invalid) protocol is introduced.

In the MESI protocol, each line of temporarily stored data has four states:

an M (modified) modified state: this line has been modified (which is different from that in a main memory) and is available in the current cache;

an E (exclusive) exclusive state: this line is the same as that in the main memory, but is different from that in other caches;

an S (shared) shared state: this line is the same as that in the main memory, but may appear in other caches; and an I (invalid) invalid state: this line does not include valid data.

A consistency system mainly includes two agents, which are a source agent CA and a target agent HA, where the CA serves as an agent for a cache and an IO, and initiates a request processing response to the HA. Each cache line has a Home, and when no cache has this cache line, all data in this cache line is saved in a memory managed by the HA. In a Home listening mode, a directory corresponding to a cache line is managed by the HA, all requests initiated by the CA are sent to the HA, and the HA listens on another CA according to the directory and responds to the requester CA. The CA and the HA are both modules for managing cache consistency, and may be implemented by using software or hardware.

Types of requests initiated by the CA include:
READE: a request for E-state data;
READS: a request for shared-state data; and
WBI: a write-back request initiated by the CA to the HA, where the CA is in an I state after write back.

Types of listening initiated by the HA include:
SNPE: snooping on the CA, where the CA is in an I state after being snooped on; and
SNPS: snooping on the CA, where the CA is in an I or S state after being snooped on.

Types of CA snooping responses include:
RSPI: the CA returns a snooping response to the HA, where the CA is in an I state after being snooped on;

RSPS: the CA returns a snooping response to the HA, where the CA is in an S state after being snooped on; and RSPIWB: the CA returns a snooping response with written-back data, where the CA is in an I state after being snooped on.

Types of request responses returned by the HA to the requester CA include:
DATAE: the HA returns an E-state data response to the requester CA; and
DATAS: the HA returns an S-state data response to the requester CA.

The following describes, by using an actual example, a process in which a cache consistency conflict is generated. Referring to FIG. 11, when a CA0 and a CA1 initiate requests for exclusive occupation of same data to the HA, an HA first processes a request from the CA0, and sends a snooping request SNPE to the CA1; after the CA1 returns a response frame RSPI, the HA returns E-state data DATAE to the CA0, and then processes a request from the CA1, and sends a snooping request SNPE to the CA0; if there is a delay for transmitting the returned E-state data DATAE, and the snooping request SNPE reaches the CA0 before the E-state data DATAE reaches the CA0 (in this case, data in the CA0 is in an invalid state), after the CA0 returns the response frame RSPI to the HA, the HA also sends the E-state data DATAE to the CA1, and in this case the E-state data simultaneously exists in the two CAs; as a result, the CA0 and the CA1 each consider that the data is exclusively occupied only by itself in the system, and therefore the CA0 and the CA1 can modify the obtained data (E→M), thereby causing that data saved in the two CAs is inconsistent, and generating a conflict.

To solve the conflict, the following two methods are generally used for processing currently:

In a first method, referring to FIG. 12, when a CA0 and a CA1 initiate exclusive occupation requests for same data to an HA, the HA first processes the request from the CA0, and sends a snooping request SNPE to the CA1; after the CA1 returns a response frame RSPI, the HA returns E-state data DATAE to the CA0, and then processes the request from the CA1, and sends a snooping request SNPE to the CA0; after receiving the snooping request SNPE, the CA0 invalidates the data received by the CA0, and then returns a response frame RSPI to the HA; and after receiving the response frame RSPI, the HA returns the E-state data DATAE to the CA1. In the entire processing procedure, the HA must ensure that the CA0 first receives the E-state data DATAE, and then receives the snooping request SNPE; and finally in the entire system, only the data saved in the CA1 is in an exclusive state.

In a second method, referring to FIG. 13, similarly, when a CA0 and a CA1 initiate exclusive occupation requests for same data to an HA, the HA first processes the request from the CA0, returns E-state data DATAE to the CA0, and then the HA needs to start processing the request from the CA1 only after receiving an acknowledgment frame ACK sent by the CA0; and similarly, after receiving the E-state data DATAE returned by the HA, the CA1 also needs to return an acknowledgment frame ACK to the HA.

In the foregoing first manner, to avoid a conflict, the HA needs to strictly control a sequence of receiving the data response DATAE and the snooping request SNPE at the CA end. In the second manner, one ACK packet needs to be additionally added to each request of the CA, which increases burden on link transmission; and in addition, one ACK packet needs to be additionally processed, which increases a delay of the entire request and reduces data processing efficiency. Therefore, it is necessary to provide a new method to solve the foregoing problem.

SUMMARY

In view of this, embodiments of the present invention provide a method for temporarily storing data and a storage device, which can solve a problem of a cache consistency conflict in a case in which a packet receiving sequence is not strictly controlled or an ACK packet is not additionally added, so as to improve data processing efficiency.

A first aspect of the embodiments of the present invention provides a method for temporarily storing data, where the method for temporarily storing data is applied to a storage device, and the storage device includes a source agent and a target agent, and the method includes:

sending, by the source agent, a data obtaining request to the target agent;

receiving, by the source agent, target data that is corresponding to the data obtaining request and is returned by the target agent;

determining, by the source agent, whether a snooping request that is for the target data and sent by the target agent is received after the data obtaining request is sent and before the target data is received, where the snooping request indicates that the target agent is simultaneously processing an obtaining request from another source agent for the target data; and if the snooping request is received, discarding, by the source agent, the target data, or if the snooping request is not received, saving, by the source agent, the target data.

With reference to the first aspect of the embodiments of the present invention, in a first implementation manner of the first aspect of the embodiments of the present invention, after the saving, by the source agent, the target data, the method further includes:

if the source agent receives the snooping request that is for the target data and sent by the target agent, invalidating, by the source agent, the saved target data.

With reference to the first aspect or the first implementation manner of the first aspect of the embodiments of the present invention, in a second implementation manner of the first aspect of the embodiments of the present invention, after the discarding, by the source agent, the target data, the method further includes:

repeatedly sending, by the source agent, the data obtaining request to the target agent, until the source agent determines that the snooping request that is for the target data and sent by the target agent is not received after the data obtaining request is sent and before the target data is received this time, and saving, by the source agent, the target data.

With reference to the first aspect or the first implementation manner of the first aspect of the embodiments of the present invention, in a third implementation manner of the first aspect of the embodiments of the present invention, after the discarding, by the source agent, the target data, the method further includes:

repeatedly sending, by the source agent, the data obtaining request to the target agent, and if a quantity of times of repeatedly sending the data obtaining request reaches a preset quantity of times of repetitions, and the source agent receives, within the preset quantity of times of repetitions and after sending the data obtaining request and before receiving the target data each time, the snooping request that is for the target data and sent by the target agent, sending, by the source agent, an upgraded version of the data obtaining request to the target agent, to prevent the target agent from simultaneously processing the obtaining request from the another source agent for the target data;

receiving and saving, by the source agent, the target data returned by the target agent; and sending, by the source agent, an acknowledgment frame to the target agent.

With reference to the first aspect, or the first implementation manner of the first aspect, or the second implementation manner of the first aspect, or the third implementation manner of the first aspect of the embodiments of the present invention, in a fourth implementation manner of the first aspect of the embodiments of the present invention, the data obtaining request includes a request for exclusive-state target data and a request for shared-state target data.

A second aspect of the embodiments of the present invention provides another method for temporarily storing data, where the method for temporarily storing data is applied to a storage device, the storage device includes a source agent and a target agent, and the method includes:

receiving, by the target agent, a data obtaining request sent by the source agent;

searching, by the target agent, for target data corresponding to the data obtaining request, and returning the target data to the source agent;

after the source agent sends the data obtaining request and before the source agent receives the target data, sending, by the target agent, a snooping request for the target data to the source agent, to indicate that the target agent is simultaneously processing an obtaining request from another source agent for the target data;

receiving, by the target agent, the data obtaining request repeatedly sent by the source agent; and responding, by the target agent, to the repeatedly sent data obtaining request, and repeatedly sending the target data to the source agent.

With reference to the second aspect of the embodiments of the present invention, in a first implementation manner of the second aspect of the embodiments of the present invention, before the returning, by the target agent, the target data corresponding to the data obtaining request to the source agent, the method further includes:

sending, by the target agent, a snooping request for the target data to the another source agent, to indicate that the target agent is processing an obtaining request from the source agent for the target data, where non-invalid-state data is saved in the another source agent; and receiving, by the target agent, a snooping response returned by the another source agent.

With reference to the second aspect or the first implementation manner of the second aspect of the embodiments of the present invention, in a second implementation manner of the second aspect of the embodiments of the present invention, the method further includes:

receiving, by the target agent, an upgraded version of the data obtaining request sent by the source agent, where the upgraded version of the data obtaining request is used to prevent the target agent from simultaneously processing the obtaining request from the another source agent for the target data;

stopping, by the target agent, processing the obtaining request from the another source agent for the target data, and sending the target data to the source agent;

receiving, by the target agent, an acknowledgment frame returned by the source agent; and restarting, by the target agent, processing the obtaining request from the another source agent for the target data.

With reference to the second aspect, or the first implementation manner of the second aspect, or the second implementation manner of the second aspect of the embodiments of the present invention, in a third implementation manner of the second aspect of the embodiments of the present invention, the data obtaining request includes a request for exclusive-state target data and a request for shared-state target data.

A third aspect of the embodiments of the present invention provides a storage device, where the storage device includes a source agent and a target agent, and the source agent includes:

a first sending unit, configured to send a data obtaining request to the target agent;

a first receiving unit, configured to receive target data that is corresponding to the data obtaining request and is returned by the target agent;

a determining unit, configured to determine whether the first receiving unit receives, after the first sending unit sends the data obtaining request and before the first receiving unit receives the target data, a snooping request that is for the target data and sent by the target agent, where the snooping request indicates that the target agent is simultaneously processing an obtaining request from another source agent for the target data; and a first processing unit, configured to: when the determining unit determines that the first receiving unit receives the snooping request that is for the target data and sent by the target agent, discard the target data, or when the determining unit determines that the first receiving unit does not receive the snooping request that is for the target data and sent by the target agent, save the target data.

With reference to the third aspect of the embodiments of the present invention, in a first implementation manner of the third aspect of the embodiments of the present invention, the first receiving unit is further configured to: after the first processing unit saves the target data, receive the snooping request that is for the target data and sent by the target agent; and the first processing unit is further configured to invalidate the saved target data.

With reference to the third aspect or the first implementation manner of the third aspect of the embodiments of the present invention, in a second implementation manner of the third aspect of the embodiments of the present invention, the first sending unit is further configured to: after the first processing unit discards the target data, repeatedly send the data obtaining request to the target agent, until the determining unit determines that the first receiving unit does not receive, after the data obtaining request is sent and before the target data is received this time, the snooping request that is for the target data and sent by the target agent.

With reference to the third aspect or the first implementation manner of the third aspect of the embodiments of the present invention, in a third implementation manner of the third aspect of the embodiments of the present invention, the first sending unit is further configured to: after the processing unit discards the target data, repeatedly send the data obtaining request to the target agent;

the determining unit is further configured to determine whether the first receiving unit receives, within a preset quantity of times of repetitions and after the data obtaining request is sent and before the target data is received each time, the snooping request that is for the target data and sent by the target agent, and if yes, trigger the first sending unit to send an upgraded version of the data obtaining request to the target agent, to prevent the target agent from simultaneously processing the obtaining request from the another source agent for the target data; and the first sending unit is further configured to: after the first receiving unit receives the target data, send an acknowledgment frame to the target agent.

With reference to the third aspect, or the first implementation manner of the third aspect, or the second implementation manner of the third aspect, or the third implementation manner of the third aspect of the embodiments of the present invention, in a fourth implementation manner of the third aspect of the embodiments of the present invention, the data obtaining request sent by the first sending unit includes a request for exclusive-state target data and a request for shared-state target data.

A fourth aspect of the embodiments of the present invention provides another storage device, where the storage device includes a source agent and a target agent, and the target agent includes:

a second receiving unit, configured to receive a data obtaining request sent by the source agent;

a second processing unit, configured to search for target data corresponding to the data obtaining request; and a second sending unit, configured to: after the source agent sends the data obtaining request and before the source agent receives the target data, send a snooping request for the target data to the source agent, to indicate that the target agent is simultaneously processing an obtaining request from another source agent for the target data, where the second receiving unit is further configured to receive the data obtaining request repeatedly sent by the source agent; and the second sending unit is further configured to: after the second processing unit responds to the repeatedly sent data obtaining request, repeatedly send the target data to the source agent.

With reference to the fourth aspect of the embodiments of the present invention, in a first implementation manner of the fourth aspect of the embodiments of the present invention, the second sending unit is further configured to: before sending the target data to the source agent, send a snooping request for the target data to the another source agent, to indicate that the target agent is processing an obtaining request from the source agent for the target data, where non-invalid-state data is saved in the another source agent; and the second receiving unit is further configured to receive a snooping response returned by the another source agent.

With reference to the fourth aspect or the first implementation manner of the fourth aspect of the embodiments of the present invention, in a second implementation manner of the fourth aspect of the embodiments of the present invention, the second receiving unit is further configured to receive an upgraded version of the data obtaining request sent by the source agent, where the upgraded version of the data obtaining request is used to prevent the target agent from simultaneously processing the obtaining request from the another source agent for the target data;

the second processing unit is further configured to: after the second receiving unit receives the upgraded version of the data obtaining request, stop processing the obtaining request from the another source agent for the target data, and trigger the second sending unit to send the target data to the source agent;

the second receiving unit is further configured to receive an acknowledgment frame returned by the source agent; and the second processing unit is further configured to: after the second receiving unit receives the acknowledgment frame, restart processing the obtaining request from the another source agent for the target data.

With reference to the fourth aspect, or the first implementation manner of the fourth aspect, or the second implementation manner of the fourth aspect of the embodiments of the present invention, in a third implementation manner of the fourth aspect of the embodiments of the present invention, the data obtaining request received by the second receiving unit includes a request for exclusive-state target data and a request for shared-state target data.

It can be seen from the foregoing technical solutions that, embodiments of the present invention have the following advantages:

In the embodiments of the present invention, after receiving target data returned by a target agent, a source agent determines whether a snooping request that is for the target data and sent by the target agent is received after a data obtaining request is sent and before the target data is received, and if the snooping request is received, it indicates that in this case, another source agent is also requesting the target data from the target agent, which causes a consistency conflict problem, and then, the source agent discards the received target data, to avoid the conflict; if the snooping request is not received, the source agent saves the received target data. In the embodiments of the present invention, the source agent determines a target data processing manner by determining whether a snooping request that is for the target data and sent by the target agent is received after the data obtaining request is sent and before the target data is received, which can solve a problem of a cache consistency conflict; in addition, there is no requirement on a packet receiving sequence, and an ACK packet does not need to be additionally added, thereby reducing a request processing time, and improving data processing efficiency.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiments of the present invention provide a method for temporarily storing data and a storage device, where the method for temporarily storing data is applied to the storage device, the storage device includes a source agent and a target agent, and there may be one or multiple source agents and target agents. The embodiments of the present invention can solve a problem of a cache consistency conflict in a case in which a packet receiving sequence is not strictly controlled or an ACK packet is not additionally added, so as to improve data processing efficiency.

Figure 1:
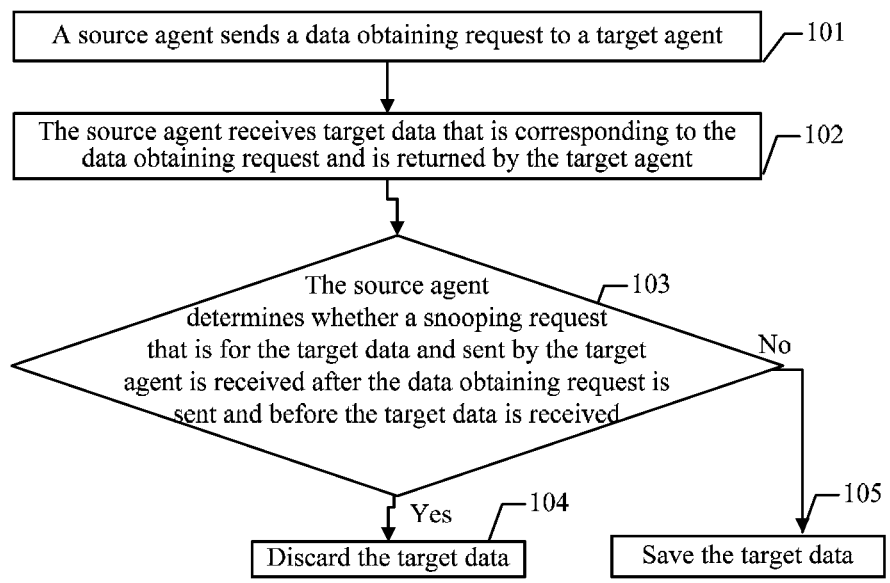
FIG. 1 is a schematic diagram of an embodiment of a method for temporarily storing data according to the present invention.

In the following, referring to FIG. 1, FIG. 1 is a schematic diagram of an embodiment of a method for temporarily storing data according to the present invention. This embodiment mainly describes the method for temporarily storing data from a source agent side, and the method in this embodiment includes:

101: A source agent sends a data obtaining request to a target agent.

102: The source agent receives target data that is corresponding to the data obtaining request and is returned by the target agent.

103: The source agent determines whether a snooping request that is for the target data and sent by the target agent is received after the data obtaining request is sent and before the target data is received, and if yes, perform step 104; if not, perform step 105.

The snooping request indicates that the target agent is simultaneously processing an obtaining request from another source agent for the target data.

104: The source agent discards the target data.

105: The source agent saves the target data.

Figure 2:
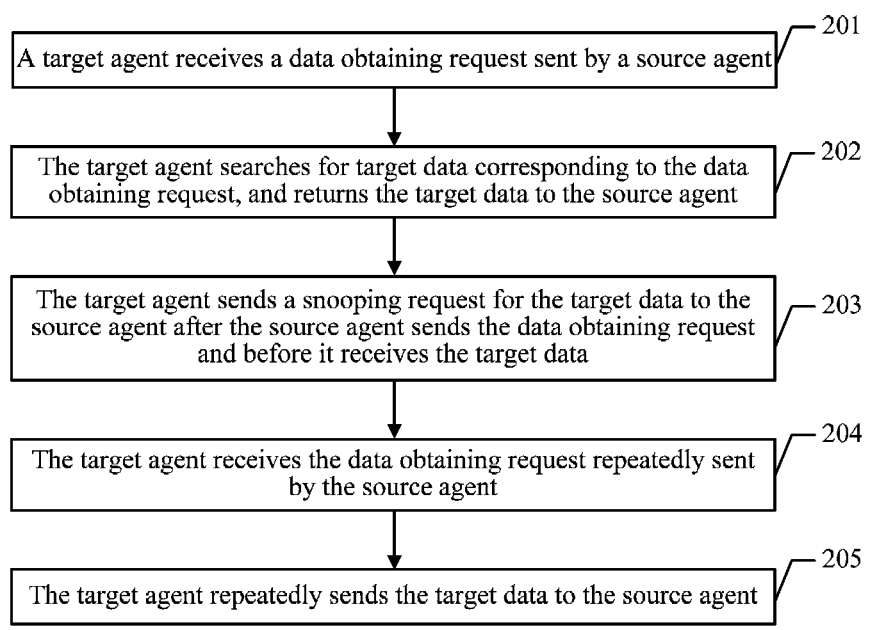
FIG. 2 is a schematic diagram of another embodiment of a method for temporarily storing data according to the present invention.

The following describes the method for temporarily storing data from a target agent side. Referring to FIG. 2, the method in this embodiment includes:

201: A target agent receives a data obtaining request sent by a source agent.

202: The target agent searches for target data corresponding to the data obtaining request, and returns the target data to the source agent.

The source agent repeatedly sends the data obtaining request to the target agent, to notify the target agent that the source agent receives a snooping request that is for the target data and sent by the target agent after sending the data obtaining request and before receiving the target data, where that the target agent sends the snooping request for the target data to the source agent indicates that the target agent is simultaneously processing an obtaining request from another source agent for the target data.

203: The target agent sends the snooping request for the target data to the source agent after the source agent sends the data obtaining request and before the source agent receives the target data.

The sending the snooping request aims at indicating that the target agent is simultaneously processing the obtaining request from another source agent for the target data.

204: The target agent receives the data obtaining request repeatedly sent by the source agent.

205: The target agent responds to the repeatedly sent data obtaining request, and repeatedly sends the target data to the source agent.

In a specific implementation, the data obtaining request sent by the source agent includes a request for exclusive-state E (exclusive) state target data and a request for shared-state S (shared) state target data. After the E-state target data is modified, the target data is in a modified state M (modified) state. The E-state target data, the S-state target data, and the M-state target data may all be invalidated, to change into an invalid state I (invalid) state. Different source agents may request target data in a same state from a same target agent, or request target data in different states. The target data and conditions of requests from the source agents for the target data are saved in the target agent; the target agent may receive data obtaining requests initiated by all source agents, listen on all source agents according to the target data and the conditions of the requests from the source agents for the target data that are saved in the target agent, and respond to the requests.

For ease of understanding, by using several instances and in combination with the source agent and the target agent, the following describes the method for temporarily storing data according to the present invention. In all of the following several instances, CA represents the source agent, and HA represents the target agent.

Figure 3:
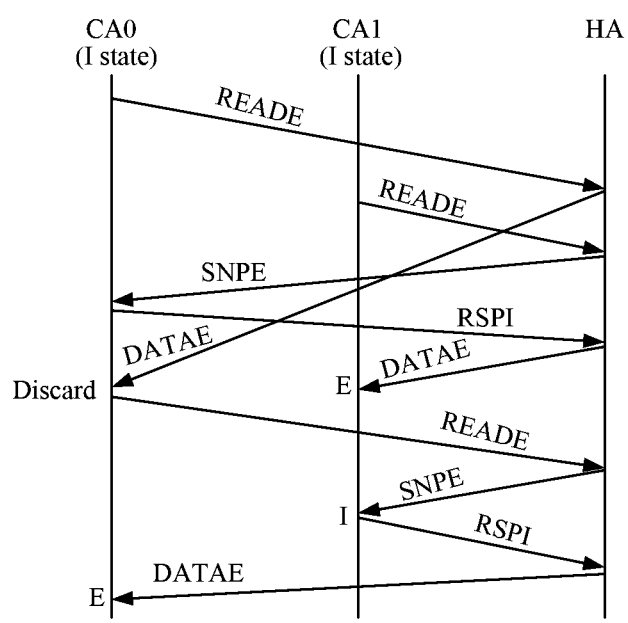
FIG. 3 is a schematic diagram of another embodiment of a method for temporarily storing data according to the present invention.

First, referring to FIG. 3, in FIG. 3, there are two source agents, which are a CA0 and a CA1, and there is only one target agent, which is an HA. Initially, neither the CA0 nor the CA1 includes valid data, that is, the CA0 and the CA1 are in an I state. The CA0 and the CA1 successively initiates E-state data requests READE to the HA; the HA first receives the E-state data request READE sent by the CA0, and first processes the request from the CA0; because the CA1 does not include valid data, the HA directly returns E-state data DATAE to the CA0; next, the HA processes the request from the CA1, and because that the CA0 has requested the E-state data DATAE is recorded in the HA, the HA initiates a snooping request SNPE for the E-state data DATAE to the CA0; in this case, because there is a delay for transmitting the E-state data DATAE that is returned to the CA0 by the HA, the CA0 has not received the E-state data DATAE, and the CA0 returns a snooping response RSPI to the HA; the HA returns the E-state data DATAE to the CA1 after receiving the snooping response RSPI returned by the CA0, and the CA1 saves the received E-state data DATAE, and in this case, the CA0 just receives the E-state data DATAE returned by the HA; because the CA0 receives the snooping request SNPE for the E-state data DATAE after sending the E-state data request READE to the HA and before receiving the E-state data DATAE returned by the HA, the CA0 discards the received E-state data DATAE, and initiates an E-state data request READE to the HA again; the HA initiates a snooping request SNPE to the CA1 after receiving the E-state data request READE initiated by the CA0, and the CA1 invalidates, after receiving the snooping request SNPE, the saved E-state data DATAE and returns a snooping response RSPI to the HA; the HA returns the E-state data DATAE to the CA0 after receiving a snooping response RSPI returned by the CA1; because the CA0 does not receive the snooping request SNPE after sending the E-state data request READE to the HA and before receiving the E-state data DATAE returned by the HA, for the second time, the CA0 saves the received E-state data DATAE; in this case, the E-state data DATAE is saved only in the CA0, that is, the CA0 exclusively occupies target data, and the CA0 may modify or write back the E-state data DATAE.

Figure 4:
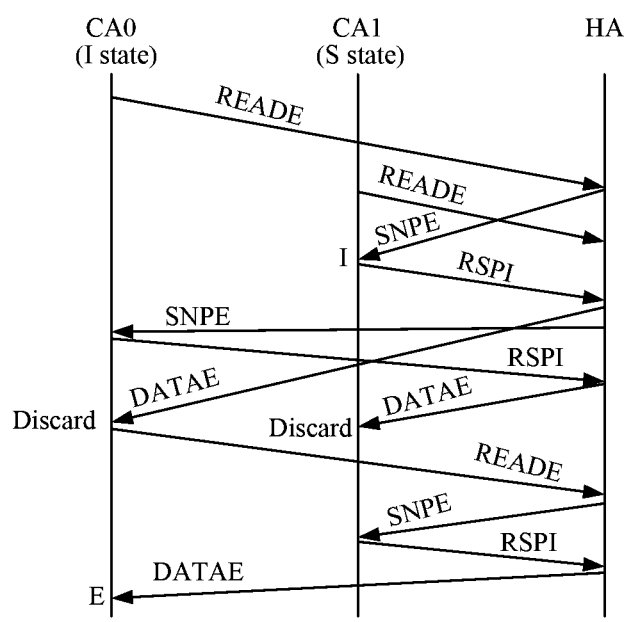
FIG. 4 is a schematic diagram of another embodiment of a method for temporarily storing data according to the present invention.

FIG. 3 describes a method for solving a cache consistency conflict when both a CA0 and a CA1 are initially in an I state, and FIG. 4 describes a method for solving a cache consistency conflict when initially a CA0 is in an I state and a CA1 is in an S state. Refer to FIG. 4. Similarly, the CA0 and the CA1 successively initiates E-state data requests READE to an HA, the HA first processes the request from the CA0; because that the CA1 is in an S state (that is, non-invalid-state data is saved in the CA1) is recorded in the HA, the HA first initiates, to the CA1, a snooping request SNPE for the E-state data DATAE requested by the CA0, and after the CA1 invalidates originally saved S-state data and returns a snooping response RSPI to the HA, the HA returns the E-state data DATAE to the CA0; next, the HA processes the request from the CA1; similarly, because of a transmission delay, the CA0 receives a snooping request SNPE after sending the E-state data request READE to the HA and before receiving the E-state data DATAE returned by the HA, and the CA1 discards the received E-state data DATAE, and initiates the E-state data request READE to the HA again; and at the same time, the CA1 also receives the E-state data DATAE returned by the HA; similarly, the CA1 also receives a snooping request SNPE after sending the E-state data request READE to the HA and before receiving the E-state data DATAE returned by the HA, the CA1 also discards the received E-state data; in this case, the CA1 stops initiating a request again, and the CA0 initiates a request to the HA again and then saves the received E-state data DATAE.

Figure 5:
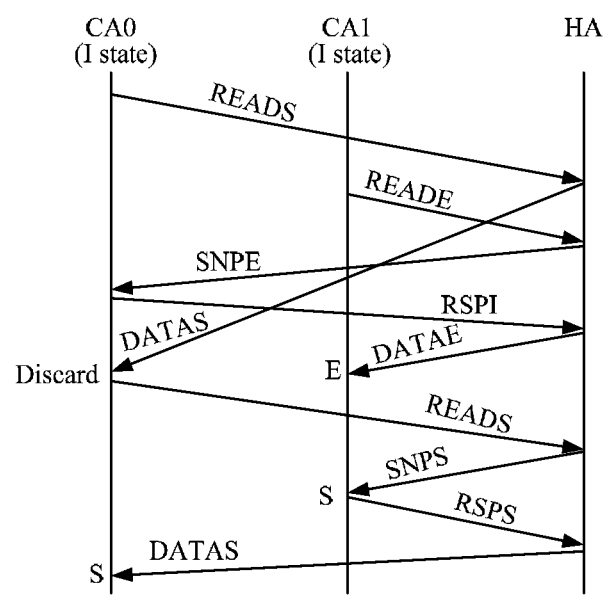
FIG. 5 is a schematic diagram of another embodiment of a method for temporarily storing data according to the present invention.
Figure 6:
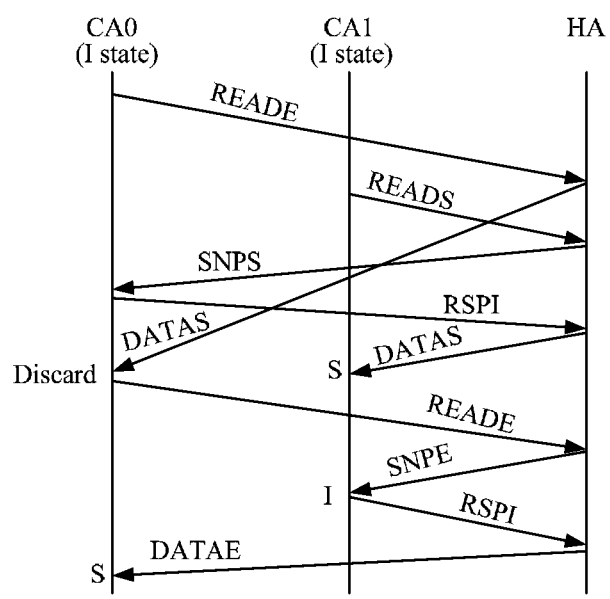
FIG. 6 is a schematic diagram of another embodiment of a method for temporarily storing data according to the present invention.

FIG. 3 and FIG. 4 describe a processing method that is performed when both the CA0 and the CA1 request the E-state data from the HA, and FIG. 5 and FIG. 6 describe a processing method that is performed when two CAs separately request E-state data and S-state data from an HA.

First, referring to FIG. 5, initially, both a CA0 and a CA1 are in an I state, and an HA successively receives an S-state data request READS sent by the CA0 and an E-state data request READE sent by the CA1; the HA first processes the first received request that is sent by the CA0, and returns S-state data DATAS to the CA0; next, the HA processes the request sent by the CA1, snoops on the CA0, and returns E-state data DATAE to the CA1 after the CA0 returns a snooping response RSPI, and the CA1 saves the received E-state data DATAE; because of a data transmission delay, the CA0 receives a snooping SNPE after sending the S-state data request READS to the HA and before receiving the S-state data DATAS returned by the HA, and the CA0 discards the received S-state data DATAS; the CA0 sends an S-state data request READS to the HA again, the HA sends, to the CA1, a snooping request SNPS for the S-state data DATAS requested by the CA0; the CA1 changes, after receiving the snooping request SNPS, the saved E-state data into S-state data and returns a snooping response RSPS to the HA, and the HA returns the S-state data DATAS to the CA0; and in addition, after receiving the snooping request SNPS, the CA1 may also change the saved E-state data into I-state data, and then return the snooping response RSPI to the HA.

In the following, referring to FIG. 6, initially, both a CA0 and a CA1 are in an I state, but contrary to FIG. 5, the CA0 sends an E-state data request READE to an HA, and the CA1 sends an S-state data request READS to the HA. In this case, S-state data DATAS is saved in the CA1; and after the CA0 initiates the E-state data request READE to the HA again, the CA1 invalidates the saved S-state data DATAS, and then returns a snooping response RSPI to the HA; and the HA returns E-state data DATAE to the CA0.

FIG. 3 to FIG. 6 describe that, after a few number of repeated requests, the CA0 and/or the CA1 obtain target data that can be saved. In an extremely pessimistic case, it may appear that no matter how many times the CA0 or the CA1 repeatedly initiates a request, the CA0 or the CA1 receives, after sending the data obtaining request to the HA and before receiving the target data returned by the HA each time, the snooping request that is for the target data and sent by the HA, and the CA0 and/or the CA1 cannot obtain the data that can be saved. In this case, an upgraded version of a data obtaining request needs to be sent, to prevent a target agent from simultaneously processing an obtaining request from another source agent for the target data. The following describes a processing method that is performed in this case by using FIG. 7 and FIG. 8 as examples.

Figure 7:
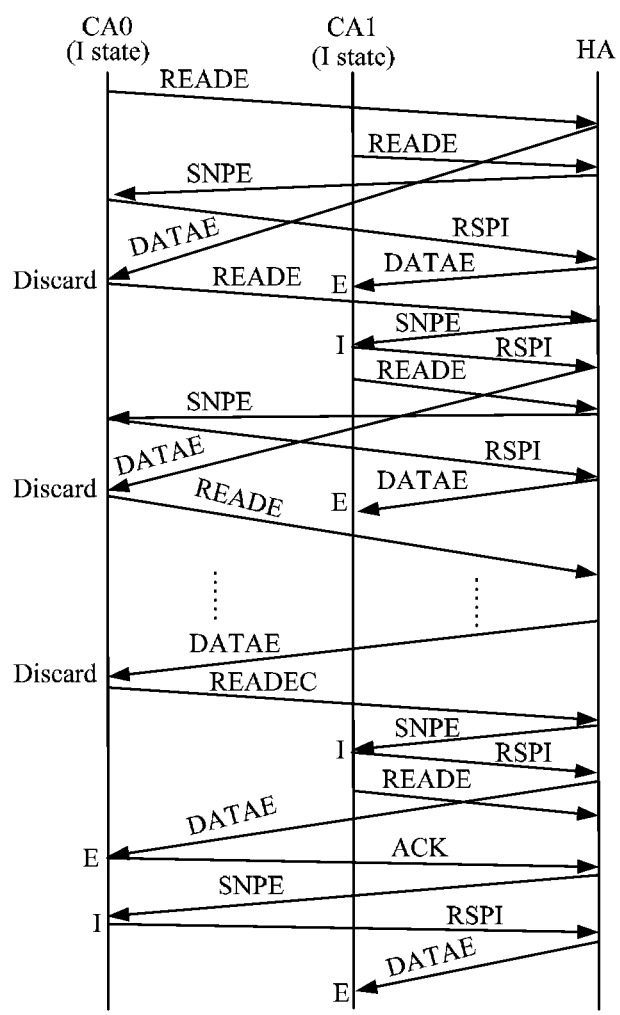
FIG. 7 is a schematic diagram of another embodiment of a method for temporarily storing data according to the present invention.

First, referring to FIG. 7, a CA0 and a CA1 successively initiates a same E-state data request READE to an HA, and after multiple times of repeated requests, for the CA0, the CA0 receives, after sending the E-state data request READE to the HA and before receiving E-state data DATAE returned by the HA each time, a snooping request SNPE sent by the HA. In this case, the CA0 end may preset a quantity of times of repetitions; when a quantity of times of repeatedly sending, by the CA0, a request to the HA exceeds the preset quantity of times of repetitions, the CA0 instead sends an upgraded version of an E-state data request READEC to the HA; and after receiving the READEC, the HA stops processing an obtaining request sent by another CA for the E-state data, and returns the E-state data to the CA0, and the HA does not process the request from the another CA until receiving an acknowledgment frame ACK returned by the CA0.

Figure 8:
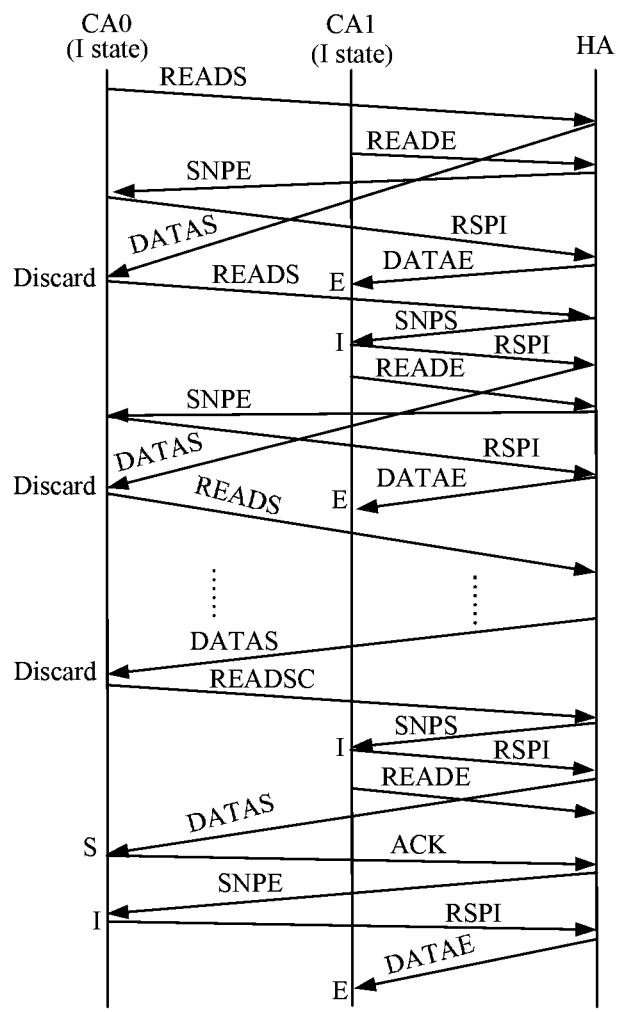
FIG. 8 is a schematic diagram of another embodiment of a method for temporarily storing data according to the present invention.

In the following, referring to FIG. 8, in FIG. 8, a CA0 requests S-state data DATAS from an HA, a CA1 requests E-state data DATAE from the HA, and after multiple times of repeated requests, for the CA0, the CA0 receives, after sending the S-state data request READS to the HA and before receiving the S-state data DATAS returned by the HA each time, a snooping request SNPE sent by the HA. In this case, the CA0 end may also preset a quantity of repetitions; when a quantity of times of repeatedly sending, by the CA0, a request to the HA exceeds the preset quantity of times of repetitions, the CA0 instead sends an upgraded version of an S-state data request READES to the HA; and after receiving the READES, the HA stops processing an obtaining request sent by another CA for the E-state data, and returns S-state data to the CA0; and the HA does not process the request from the another CA until receiving an acknowledgment frame ACK returned by the CA0.

In the foregoing several embodiments, after receiving target data, a source agent determines whether a snooping request that is for the target data and sent by a target agent is received after a data obtaining request is sent and before receiving the target data is received, and determines a target data processing manner according to a determining result, thereby preventing a problem of a cache consistency conflict; in addition, if determining results obtained for multiple times are all yes, the source agent cannot save the obtained target data all of the time, and the source agent instead sends an upgraded version of the data obtaining request to the target agent, thereby solving the conflict problem in a manner of adding an acknowledgment frame; because there is a low probability that the acknowledgment frame needs to be added to solve the conflict, this method does not affect a request processing time too much, thereby finally solving the conflict problem on the premise of not raising a requirement on a packet receiving sequence, and improving data processing efficiency on the whole.

Figure 9:
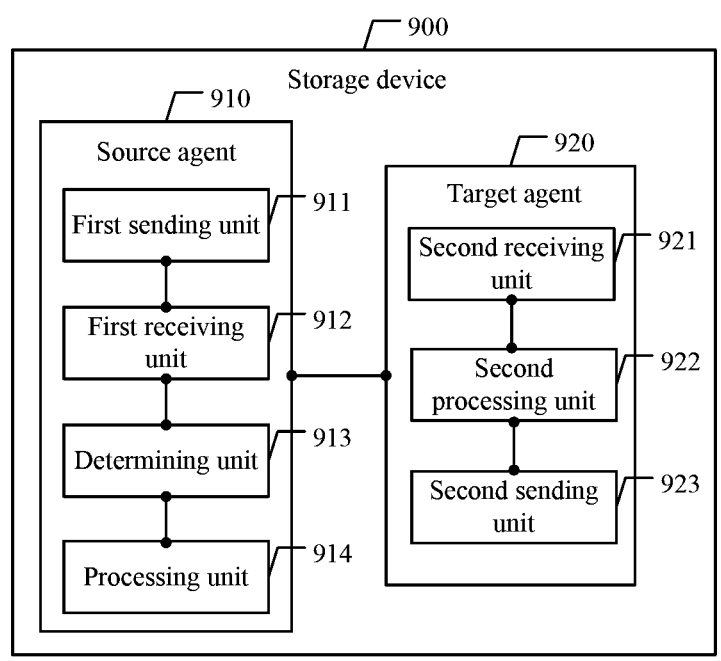
FIG. 9 is a schematic diagram of an embodiment of a storage device according to the present invention.

The following describes a storage device provided by an embodiment of the present invention. Referring to FIG. 9, a storage device 900 includes a source agent 910 and a target agent 920. In a specific embodiment, the source agent 910 includes:

a first sending unit 911, configured to send a data obtaining request to the target agent 920;

a first receiving unit 912, configured to receive target data that is corresponding to the data obtaining request and is returned by the target agent 920;

a determining unit 913, configured to determine whether the first receiving unit 912 receives, after the first sending unit 911 sends the data obtaining request and before the first receiving unit 912 receives the target data, a snooping request that is for the target data and sent by the target agent 920, where the snooping request indicates that the target agent is simultaneously processing an obtaining request from another source agent for the target data; and a first processing unit 914, configured to: when the determining unit 913 determines that the first receiving unit 912 receives the snooping request that is for the target data and sent by the target agent 920, discard the target data, when the determining unit 913 determines that the first receiving unit 912 does not receive the snooping request that is for the target data and sent by the target agent 920, save the target data.

In addition, the first receiving unit 912 is further configured to: after the first processing unit 914 saves the target data, receive the snooping request that is for the target data and sent by the target agent 920; and the first processing unit 914 is further configured to invalidate the saved target data.

In addition, the first sending unit 911 is further configured to: after the first processing unit 914 discards the target data, repeatedly send the data obtaining request to the target agent 920, until the determining unit 913 determines that the first receiving unit 912 does not receive, after the data obtaining request is sent and before the target data is received this time, the snooping request that is for the target data and sent by the target agent 920; or the determining unit 913 is further configured to determine whether the first receiving unit 912 receives, within a preset quantity of times of repetitions and after the data obtaining request is sent and before the target data is received each time, the snooping request that is for the target data and sent by the target agent 920, and if yes, trigger the first sending unit 911 to send an upgraded version of the data obtaining request to the target agent 920, to prevent the target agent 920 from simultaneously processing an obtaining request from the another source agent for the target data; and the first sending unit 911 is further configured to: after the first receiving unit 912 receives the target data, send an acknowledgment frame to the target agent 920.

In addition, the data obtaining request sent by the first sending unit 911 includes a request for exclusive-state target data and a request for shared-state target data.

Specifically, the target agent 920 includes:

a second receiving unit 921, configured to receive a data obtaining request sent by the source agent 910;

a second processing unit 922, configured to search for target data corresponding to the data obtaining request; and a second sending unit 923, configured to: after the source agent 910 sends the data obtaining request and before the source agent 910 receives the target data, send a snooping request for the target data to the source agent 910, to indicate that the target agent 920 is simultaneously processing an obtaining request from another source agent for the target data, where the second receiving unit 921 is further configured to receive the data obtaining request repeatedly sent by the source agent 910; and the second sending unit 923 is further configured to: after the second processing unit 922 responds to the repeatedly sent data obtaining request, repeatedly send the target data to the source agent.

In addition, the second sending unit 923 is further configured to: before sending the target data to the source agent 910, send a snooping request for the target data to another source agent, to indicate that the target agent 920 is processing an obtaining request from the source agent 910 for the target data, where non-invalid-state data is saved in the another source agent; and the second receiving unit 921 is further configured to receive a snooping response returned by the another source agent.

In addition, the second receiving unit 921 is further configured to receive an upgraded version of the data obtaining request sent by the source agent 910, where the upgraded version of the data obtaining request is used to prevent the target agent 920 from simultaneously processing the obtaining request from another source agent for the target data;

the second processing unit 922 is further configured to: after the second receiving unit 921 receives the upgraded version of the data obtaining request, stop processing the obtaining request from another source agent for the target data, and trigger the second sending unit 923 to send the target data to the source agent 910;

the second receiving unit 921 is further configured to receive an acknowledgment frame returned by the source agent 910; and the second processing unit 922 is further configured to: after the second receiving unit 921 receives the acknowledgment frame, restart processing the obtaining request from the another source agent for the target data.

The data obtaining request received by the second receiving unit 921 includes a request for exclusive-state target data and a request for shared-state target data.

In a specific implementation, for a process of an interaction between the source agent 910 and the target agent 920, reference may be made to description corresponding to the foregoing method embodiments, and details are not described again herein.

In this embodiment, a source agent determines a target data processing manner by determining whether a snooping request that is for target data and sent by a target agent is received after a data obtaining request is sent and before the target data is received, which can solve a problem of a cache consistency conflict; in addition, there is no requirement on a packet receiving sequence, and an ACK packet does not need to be additionally added, thereby reducing a request processing time, and improving data processing efficiency.

Figure 10:
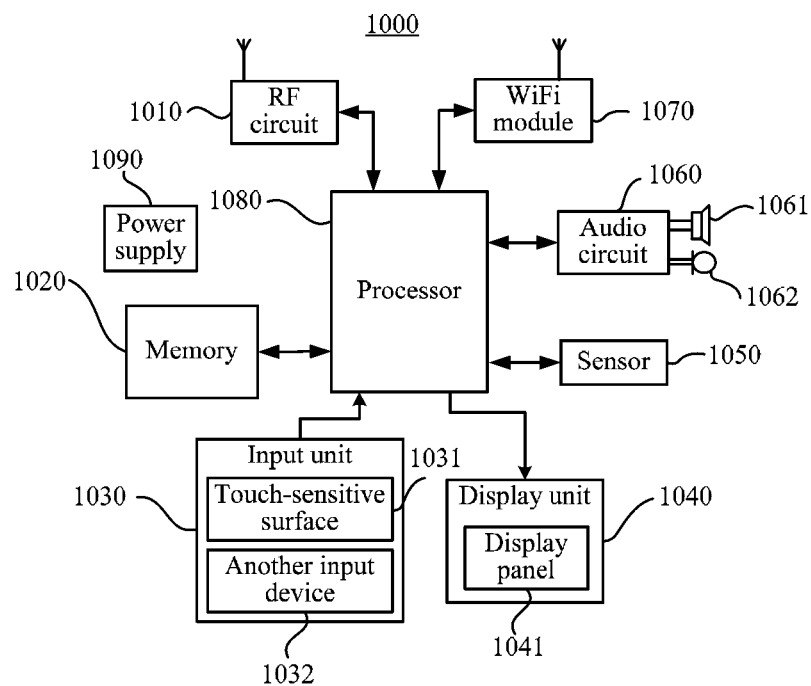
FIG. 10 is a schematic diagram of another embodiment of a storage device according to the present invention.
Figure 11:
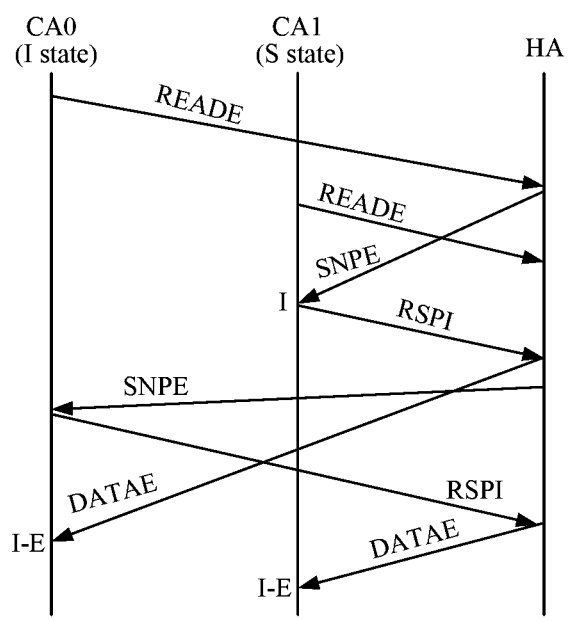
FIG. 11 is a schematic diagram of an embodiment of a method for temporarily storing data in the background.
Figure 12:
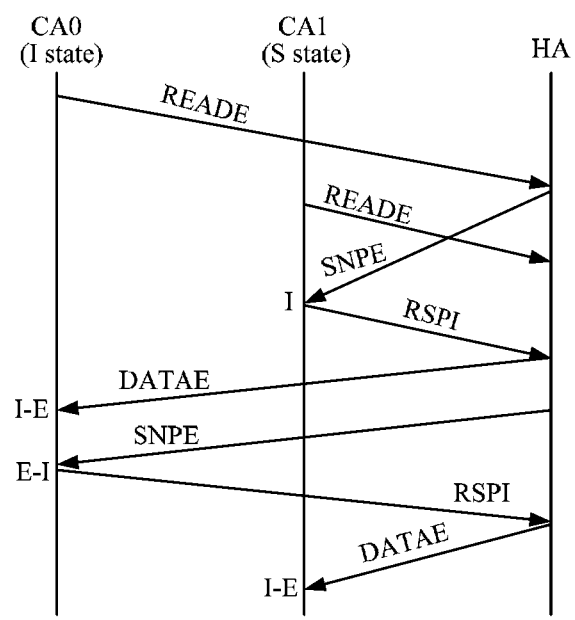
FIG. 12 is a schematic diagram of another embodiment of a method for temporarily storing data in the background.
Figure 13:
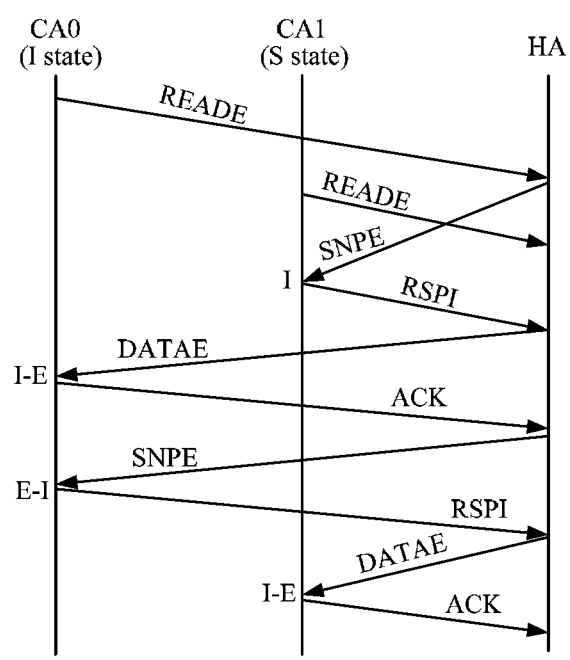
FIG. 13 is a schematic diagram of another embodiment of a method for temporarily storing data in the background.

In the following, referring to FIG. 10, FIG. 10 provides a schematic diagram of another embodiment of a storage device according to the present invention. A storage device 1000 in this embodiment may be configured to implement the method for temporarily storing data according to the foregoing embodiment. In an actual application, the storage device 1000 may be integrated to an electronic device, where the electronic device may be a computer, or the like.

Specifically, the storage device 1000 may include components such as an RF (Radio Frequency, radio frequency) circuit 1010, a memory 1020 including one or more computer readable storage media, an input unit 1030, a display unit 1040, a sensor 1050, an audio circuit 1060, a WiFi (wireless fidelity, wireless fidelity) module 1070, a processor 1080 including one or more processing cores, and a power supply 1090. Persons skilled in the art can understand that, a structure of the storage device shown in FIG. 10 does not constitute a limitation on the storage device 1000, and may include more components or fewer components than those shown in the figure, or some components may be combined, or a different component deployment may be used.

The RF circuit 1010 may be configured to receive and send a signal during a message receiving and sending process or a call process. Particularly, the RF circuit 1010 receives downlink information from a base station, then delivers the downlink information to one or more processors 1080 for processing, and sends uplink-related data to the base station. Generally, the RF circuit 1010 includes but is not limited to an antenna, at least one amplifier, a tuner, one or more oscillators, a subscriber identity module (SIM) card, a transceiver, a coupler, an LNA (Low Noise Amplifier, low noise amplifier), and a duplexer; in addition, the RF circuit 1010 may also communicate with a network and another device by wireless communication. The wireless communication may use any communications standard or protocol, which includes but is not limited to GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), e-mail, SMS (Short Messaging Service, Short Messaging Service), and the like.

The memory 1020 may be configured to store a software program and a module. The processor 1080 runs the software program and module that are stored in the memory 1020, to implement various functional applications and data processing. The memory 1020 may mainly include a program storage area and a data storage area, where the program storage area may store an operating system, an application program required by at least one function (such as a sound playback function and an image display function), and the like; and the data storage area may store data (such as audio data and a phone book) created according to use of the storage device. In addition, the memory 1020 may include a high speed random access memory, and may also include a non-volatile memory such as at least one magnetic disk storage device, a flash component, or another volatile solid-state storage device. Correspondingly, the memory 1020 may further include a memory controller, to provide access of the processor 1080 and the input unit 1030 to the memory 1020.

The input unit 1030 may be configured to receive input digit or character information, and generate a keyboard, mouse, joystick, optical, or trackball signal input related to user setting and function control. Specifically, the input unit 1030 may include a touch-sensitive surface 1031 and another input device 1032. The touch-sensitive surface 1031, which may also be referred to as a touch screen or a touch panel, can collect a touch operation of a user on or near the touch-sensitive surface (such as an operation of the user on or near the touch-sensitive surface 1031 by using any proper object or accessory, such as a finger or a stylus), and drive a corresponding connection apparatus according to a preset program. Optionally, the touch-sensitive surface 1031 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into touch point coordinates, and sends the touch point coordinates to the processor 1080, and can receive and execute a command sent by the processor 1080. In addition, the touch-sensitive surface 1031 may be a resistive type, capacitive type, infrared, or surface sound wave type touch-sensitive surface. In addition to the touch-sensitive surface 1031, the input unit 1030 may further include the another input device 1032. Specifically, the another input device 1032 may include but is not limited to one or more of a physical keyboard, a function key (such as a volume control key or a switch key), a trackball, a mouse, and a joystick.

The display unit 1040 may be configured to display information input by the user or information provided for the user, and various graphical user interfaces of the apparatus. The graphical user interfaces may be formed by a graph, a text, an icon, a video, or any combination thereof. The display unit 1040 may include a display panel 1041. Optionally, the display panel 1041 may be configured in form of an LCD (Liquid Crystal Display, liquid crystal display), an OLED (Organic Light-Emitting Diode, organic light-emitting diode), or the like. Further, the touch-sensitive surface 1031 may cover the display panel 1041. After detecting a touch operation on or near the touch-sensitive surface 1031, the touch-sensitive surface 1031 transfers the touch operation to the processor 1080, so as to determine a type of a touch event. Then, the processor 1080 provides a corresponding visual output on the display panel 1041 according to the type of the touch event. Although, in FIG. 10, the touch-sensitive surface 1031 and the display panel 1041 are used as two separate parts to implement input and output functions, in some embodiments, the touch-sensitive surface 1031 and the display panel 1041 may be integrated to implement the input and output functions.

The storage device 1000 may further include at least one sensor 1050, such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the storage device 1000 is moved to the ear. As one type of motion sensor, a gravity acceleration sensor can detect magnitude of accelerations in various directions (generally on three axes), may detect magnitude and a direction of the gravity when static, and may be applied to an application of recognizing the attitude of an apparatus (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the storage device 1000, are not further described herein.

The audio circuit 1060, a loudspeaker 1061, and a microphone 1062 may provide audio interfaces between a user and the storage device. The audio circuit 1060 may convert received audio data into an electric signal and transmit the electric signal to the loudspeaker 1061, and the loudspeaker 1061 converts the electrical signal into a sound signal for output. On the other hand, the microphone 1062 converts the collected sound signal into an electrical signal. The audio circuit 1060 receives the electrical signal, converts the electrical signal into audio data, and outputs the audio data to the processor 1080 for processing. Then the processor 1080 sends the audio data to, for example, another terminal by using the RF circuit 1010, or outputs the audio data to the memory 1020 for further processing. The audio circuit 1060 may further include an earplug jack, so as to provide communication between a peripheral earphone and the apparatus.

WiFi is a short distance wireless transmission technology; and by using the WiFi module 1070, the storage device 1000 can help the user receive and send emails, browse a webpage, access streaming media, and so on, which provides wireless broadband Internet access for the user. Although FIG. 10 shows the WiFi module 1070, it can be understood that, the WiFi module 1070 is not a necessary component of the apparatus, and the WiFi module may be omitted according to a need as long as the scope of the essence of the present invention is not changed.

The processor 1080 is a control center of a curved surface model creation apparatus, and is connected to various parts of the apparatus by using various interfaces and lines. By running or executing the software program and/or module stored in the memory 1020, and invoking data stored in the memory 1020, the processor 1080 performs various functions of the storage device and data processing, thereby performing overall monitoring on the storage device. Optionally, the processor 1080 may include one or more processing cores. Preferably, the processor 1080 may integrate an application processor and a modem processor. The application processor mainly processes an operating system, a user interface, an application program, and the like. The modem processor mainly processes wireless communication. It can be understood that, the foregoing modem processor may also not be integrated into the processor 1080.

The storage device 1000 further includes a power supply 1090 (such as a battery) for supplying power to the components. Preferably, the power supply may be logically connected to the processor 1080 by using a power management system, thereby implementing functions such as charging, discharging and power consumption management by using the power management system. The power supply 1090 may further include one or more direct current or alternating current power supplies, a re-charging system, a power failure detection circuit, a power supply converter or inverter, a power supply state indicator, and any other components.

Although not shown in the figure, the storage device 1000 may further include a camera, a Bluetooth module, and the like, which are not further described herein. Specifically, in this embodiment, the storage device 1000 includes the memory 1020 and one or more programs, where the one or more programs are stored in the memory 1020, and are configured to be executed by one or more processors 1080, and the one or more programs contain instructions used for performing the following operations:

sending a data obtaining request to a target agent;

receiving target data that is corresponding to the data obtaining request and is returned by the target agent;

determining whether a snooping request that is for the target data and sent by the target agent is received after the data obtaining request is sent and before the target data is received, where the snooping request indicates that the target agent is simultaneously processing an obtaining request from another source agent for the target data; and if the snooping request is received, discarding the target data, if the snooping request is not received, saving the target data;

and:

receiving a data obtaining request sent by a source agent;

searching for target data corresponding to the data obtaining request, and returning the target data to the source agent;

after the source agent sends the data obtaining request and before the source agent receives the target data, sending a snooping request for the target data to the source agent, to indicate that an obtaining request from another source agent for the target data is being simultaneously processed;

receiving the data obtaining request repeatedly sent by the source agent; and responding to the repeatedly sent data obtaining request, and repeatedly sending the target data to the source agent.

It should be noted that, the storage device 1000 provided in the embodiment of the present invention may be further configured to implement other functions in the foregoing apparatus embodiments. Details are not provided again herein, and reference may be made to the foregoing method or apparatus embodiments.

In addition, it should be noted that the described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementation manners, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is saved in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing describes in detail a method for temporarily storing data and a storage device that are provided by embodiments of the present invention. With respect to the implementation and applicability of the present invention, modifications and variations may be made by persons of ordinary skill in the art according to the idea of the embodiments of the present invention. Therefore, content of this specification should not be understood as a limit on the present disclosure.

What is claimed is:

1. A method for temporarily storing data, wherein the method is applied to a storage device, which comprises a source agent and a target agent, and the method comprises:

sending, by the source agent, a data obtaining request to the target agent;

receiving, by the source agent, target data that corresponds to the data obtaining request and is returned by the target agent;

determining, by the source agent, whether a snooping request that is for the target data and sent by the target agent is received after the data obtaining request is sent and before the target data is received, wherein the snooping request indicates that the target agent is simultaneously processing an obtaining request from another source agent for the target data; and if the snooping request is received, discarding, by the source agent, the target data, or if the snooping request is not received, saving, by the source agent, the target data.

2. The method according to claim 1, wherein after the saving, by the source agent, the target data, the method further comprises:

when the source agent receives the snooping request that is for the target data and sent by the target agent, invalidating, by the source agent, the saved target data.

3. The method according to claim 1, wherein after the discarding, by the source agent, the target data, the method further comprises:

repeatedly sending, by the source agent, the data obtaining request to the target agent, until the source agent determines that the snooping request that is for the target data and sent by the target agent is not received after the data obtaining request is sent and before the target data is received this time, and saving, by the source agent, the target data.

4. The method according to claim 1, wherein after the discarding, by the source agent, the target data, the method further comprises:

repeatedly sending, by the source agent, the data obtaining request to the target agent, and when a quantity of times of repeatedly sending the data obtaining request reaches a preset quantity of times of repetitions, and the source agent receives, within the preset quantity of times of repetitions and after sending the data obtaining request and before receiving the target data each time, the snooping request that is for the target data and sent by the target agent, sending, by the source agent, an upgraded version of the data obtaining request to the target agent, to prevent the target agent from simultaneously processing the obtaining request from the another source agent for the target data;

receiving and saving, by the source agent, the target data returned by the target agent; and sending, by the source agent, an acknowledgment frame to the target agent.

5. The method according to claim 1, wherein the data obtaining request comprises a request for exclusive-state target data and a request for shared-state target data.

6. A method for temporarily storing data, wherein the method is applied to a storage device, which comprises a source agent and a target agent, and the method comprises:

receiving, by the target agent, a data obtaining request sent by the source agent;

searching, by the target agent, for target data corresponding to the data obtaining request, and returning the target data to the source agent;

after the source agent sends the data obtaining request and before the source agent receives the target data, sending, by the target agent, a snooping request for the target data to the source agent, to indicate that the target agent is simultaneously processing an obtaining request from another source agent for the target data;

receiving, by the target agent, the data obtaining request repeatedly sent by the source agent; and responding, by the target agent, to the repeatedly sent data obtaining request, and repeatedly sending the target data to the source agent.

7. The method according to claim 6, wherein before the returning, by the target agent, the target data corresponding to the data obtaining request to the source agent, the method further comprises:

sending, by the target agent, a snooping request for the target data to the another source agent, to indicate that the target agent is processing an obtaining request from the source agent for the target data, wherein non-invalid-state data is saved in the another source agent; and receiving, by the target agent, a snooping response returned by the another source agent.

8. The method according to claim 6, wherein the method further comprises:

receiving, by the target agent, an upgraded version of the data obtaining request sent by the source agent, wherein the upgraded version of the data obtaining request is used to prevent the target agent from simultaneously processing the obtaining request from the another source agent for the target data;

stopping, by the target agent, processing the obtaining request from the another source agent for the target data, and sending the target data to the source agent;

receiving, by the target agent, an acknowledgment frame returned by the source agent; and restarting, by the target agent, processing the obtaining request from the another source agent for the target data.

9. The method according to claim 6, wherein the data obtaining request comprises a request for exclusive-state target data and a request for shared-state target data.

10. A storage device, wherein the storage device comprises a source agent and a target agent, and the source agent comprises:

a first sending unit, configured to send a data obtaining request to the target agent;

a first receiving unit, configured to receive target data that corresponds to the data obtaining request and is returned by the target agent;

a determining unit, configured to determine whether the first receiving unit receives, after the first sending unit sends the data obtaining request and before the first receiving unit receives the target data, a snooping request that is for the target data and sent by the target agent, wherein the snooping request indicates that the target agent is simultaneously processing an obtaining request from another source agent for the target data; and a first processing unit, configured to: when the determining unit determines that the first receiving unit receives the snooping request that is for the target data and sent by the target agent, discard the target data, when the determining unit determines that the first receiving unit does not receive the snooping request that is for the target data and sent by the target agent, save the target data.

11. The storage device according to claim 10, wherein the first receiving unit is further configured to: after the first processing unit saves the target data, receive the snooping request that is for the target data and sent by the target agent; and the first processing unit is further configured to invalidate the saved target data.

12. The storage device according to claim 10, wherein the first sending unit is further configured to: after the first processing unit discards the target data, repeatedly send the data obtaining request to the target agent, until the determining unit determines that the first receiving unit does not receive, after the data obtaining request is sent and before the target data is received this time, the snooping request that is for the target data and sent by the target agent.

13. The storage device according to claim 10, wherein the first sending unit is further configured to: after the processing unit discards the target data, repeatedly send the data obtaining request to the target agent;

the determining unit is further configured to determine whether the first receiving unit receives, within a preset quantity of times of repetitions and after the data obtaining request is sent and before the target data is received each time, the snooping request that is for the target data and sent by the target agent, and when the first receiving unit receives the snooping request, trigger the first sending unit to send an upgraded version of the data obtaining request to the target agent, to prevent the target agent from simultaneously processing the obtaining request from the another source agent for the target data; and the first sending unit is further configured to: after the first receiving unit receives the target data, send an acknowledgment frame to the target agent.

14. The storage device according to claim 10, wherein the data obtaining request sent by the first sending unit comprises a request for exclusive-state target data and a request for shared-state target data.

15. A storage device, wherein the storage device comprises a source agent and a target agent, and the target agent comprises:

a second receiving unit, configured to receive a data obtaining request sent by the source agent;

a second processing unit, configured to search for target data corresponding to the data obtaining request; and a second sending unit, configured to: after the source agent sends the data obtaining request and before the source agent receives the target data, send a snooping request for the target data to the source agent, to indicate that the target agent is simultaneously processing an obtaining request from another source agent for the target data, wherein the second receiving unit is further configured to receive the data obtaining request repeatedly sent by the source agent; and the second sending unit is further configured to: after the second processing unit responds to the repeatedly sent data obtaining request, repeatedly send the target data to the source agent.

16. The storage device according to claim 15, wherein the second sending unit is further configured to: before sending the target data to the source agent, send a snooping request for the target data to the another source agent, to indicate that the target agent is processing an obtaining request from the source agent for the target data, wherein non-invalid-state data is saved in the another source agent; and the second receiving unit is further configured to receive a snooping response returned by the another source agent.

17. The storage device according to claim 15, wherein the second receiving unit is further configured to receive an upgraded version of the data obtaining request sent by the source agent, wherein the upgraded version of the data obtaining request is used to prevent the target agent from simultaneously processing the obtaining request from the another source agent for the target data;

the second processing unit is further configured to: after the second receiving unit receives the upgraded version of the data obtaining request, stop processing the obtaining request from the another source agent for the target data, and trigger the second sending unit to send the target data to the source agent;

the second receiving unit is further configured to receive an acknowledgment frame returned by the source agent; and the second processing unit is further configured to: after the second receiving unit receives the acknowledgment frame, restart processing the obtaining request from the another source agent for the target data.

18. The storage device according to claim 15, wherein the data obtaining request received by the second receiving unit comprises a request for exclusive-state target data and a request for shared-state target data.

* * * * *